United States Patent Office 2,764,563
Patented Sept. 25, 1956

2,764,563

CATION EXCHANGE RESINS CONTAINING PHOSPHONATE AND SULFONATE GROUPS

Elmer L. McMaster and William K. Glesner, Midland, Mich., assignors to The Dow Chemical Company, Midland, Mich., a corporation of Delaware No Drawing. Application November 2, 1954,
Serial No. 466,443

11 Claims. (Cl. 260—2.2)

This invention concerns the acidic and salt forms of certain new cation exchange resins. It relates more particularly to insoluble resinous compositions comprising cross-linked vinyl aromatic copolymers which copolymers contain, as substituents on aromatic nuclei thereof, both phosphonate groups and sulfonate groups. The invention also concerns a method of making the resinous compositions.

The new compositions are the reaction products of a sulfonating agent, e. g. chlorosulfonic acid, and an insoluble cross-linked copolymer of a mixture of monovinyl- and polyvinyl-aromatic compounds, which copolymer contains as substituents on aromatic nuclei thereof, phosphonic acid groups, i. e. a phosphonic acid cation exchange resin. The compositions are, therefore, cation exchange resins comprising insoluble cross-linked vinyl aromatic copolymers, which copolymers contain both phosphonate groups and sulfonate groups as substituents on aromatic nuclei of the same copolymer molecule.

The terms "phosphonate group" and "sulfonate group" employed herein pertain to the phosphonic acid group and the sulfonic acid group, respectively, directly attached to carbon atoms of aromatic nuclei in the copolymer molecule and the corresponding phosphonate salt group and the sulfonate salt group.

The new compositions are prepared by first introducing phosphonic acid groups as substituents on aromatic nuclei of an insoluble, cross-linked copolymer of one or more monovinyl aromatic compounds and one or more polyvinyl aromatic compounds and thereafter introducing sulfonic acid groups as substituents on aromatic nuclei of the same copolymer molecule. It is necessary that the phosphonic acid groups and the sulfonic acid groups be introduced, as nuclear substituents, in the order just stated. The resulting modified copolymer, containing both of these kinds of acidic groups, is insoluble in aqueous liquids, e. g. water or aqueous solutions of acids, bases, or salts, and in usual organic solvents, and is effective as a cation exchange resin. It can be converted by neutralization with suitable bases, or by employment in ion exchange processes, into the sodium, potassium, calcium, magnesium, or other metal salts thereof, which salts are also insoluble in the above-mentioned liquids.

A variety of insoluble, cross-linked copolymers of monovinyl- and polyvinyl-aromatic compounds suitable for use as starting materials in making the ion exchange resins of the invention, are known in the art. The relative proportions of monovinyl- and polyvinyl-aromatic compounds chemically combined in such copolymers can be varied as widely as desired, but for the purpose of this invention copolymers of 80 to 99.5 weight per cent of one or more monovinyl aromatic hydrocarbons and from 20 to 0.5 per cent of one or more divinyl aromatic hydrocarbons are usually, and advantageously, employed. Examples of suitable monovinyl aromatic hydrocarbons are styrene, vinyltoluene, vinylxylene, ethylvinylbenzene, isopropylvinylbenzene, and ethylvinyltoluene. Examples of suitable divinyl aromatic hydrocarbons are divinylbenzene, divinyltoluene, divinylxylene, and ethyldivinylbenzene. Copolymers of at least 80 per cent by weight of styrene, a lesser amount of ethylvinylbenzene, and from 0.5 to 10 per cent of divinylbenzene are preferred.

The insoluble cross-linked copolymers can be prepared by a variety of well-known methods employed for the polymerization of styrene. A mixture of the monomeric materials can be polymerized in bulk, i. e. in the substantial absence of an inert liquid medium, or while dispersed as an aqueous emulsion or suspension thereof in an inert non-solvent medium. Suspension methods, wherein a mixture of the monomeric materials is dispersed in a liquid non-solvent medium such as water, or brine, then heated, agitated and copolymerized, are preferred because such methods form hard copolymer particles in the form of spheroids, beads, or rounded granules, and the size of the particles can readily be controlled.

The polymerization of the vinyl aromatic compounds is accelerated by means of catalysts such as benzoyl peroxide, di-tertiary-butyl peroxide, cumene peroxide, hydrogen peroxide, sodium persulfate, potassium persulfate, etc. The catalysts are employed in amounts of from 0.1 to 2 per cent by weight of the monomeric materials to be polymerized.

The substitution of phosphonic acid groups on aromatic nuclei of the copolymer is accomplished by reacting phosphorus trichloride with small particles of the insoluble cross-linked copolymer in the presence of a Friedel-Crafts catalyst, e. g. aluminum chloride, whereby a polymeric composition containing phosphoryl dichloride groups as substituents on aromatic nuclei thereof, is formed. The phosphoryl dichloride groups are converted to phosphonic acid groups, e. g. by chlorinating said groups to the corresponding phosphonyl tetrachloride groups and hydrolyzing the latter groups whereby phosphonic acid groups are formed.

The reaction of phosphorus trichloride with the insoluble cross-linked copolymer can readily be carried out by dispersing the finely-divided copolymer in an amount of the liquid phosphorus trichloride sufficient to form a slurry or dispersion which can conveniently be stirred, adding a Friedel-Crafts catalyst, e. g. aluminum chloride, and heating the mixture at temperatures between 60° and 150° C. at atmospheric or substantially atmospheric pressure. The catalyst can be employed in amount corresponding to form 0.2 to 2, preferably from 0.5 to 1.5, parts by weight per part of the copolymer.

It is desirable that the copolymer contain at least 0.5 substituent phosphonic acid group per 10 aromatic nuclei. A copolymer containing at least two, preferably from two to ten, phosphonic acid groups for every ten aromatic nuclei in the copolymer is preferred.

Reaction of the phosphorus trichloride with the copolymer is usually continued until the copolymer contains an average of from two to ten, phosphoryl dichloride groups as substituents directly attached to carbon atoms of aromatic nuclei per ten aromatic nuclei in the copolymer. The number of the substituent phosphoryl dichloride groups can readily be determined by withdrawing a portion of the copolymer beads from the reaction mixture, washing the same with water, thereby converting the phosphoryl dichloride groups to phosphonus acid groups and titrating said acid groups with an alkali, e. g. sodium hydroxide. The phosphorated copolymer is separated from the unreacted phosphorus trichloride in usual ways, e. g. by filtering. The phosphoryl dichloride groups are then oxidized, e. g. by reacting the substituent phosphoryl dichloride groups with chlorine, while the finely divided copolymer is suspended in a liquid medium such as carbon tetrachloride, chloroform, or ortho-dichlorobenzene, to convert the phosphoryl dichloride groups to the corresponding phosphonyl tetrachloride groups. The chlorination is usually carried out at temperatures between 0° and 80° C. and at atmospheric pressure or thereabout. The chlorination occurs readily and is usually complete to form the corresponding phosphonyl tetrachloride groups, when chlorine is no longer readily absorbed in the mixture.

The copolymer containing the phosphonyl tetrachloride groups as substituents on aromatic nuclei thereof, is separated from the reaction medium in usual ways, e. g. by filtering and is washed with water. Washing, or treating, of the copolymer with water at ordinary temperatures usually results in the hydrolysis of all, or nearly all, of the phosphonyl tetrachloride groups to the corresponding phosphonic acid groups. Hydrolysis of the phosphonyl tetrachloride groups to the phosphonic acid groups is preferably carried out by heating the copolymer with water at temperatures up to 100° C. Thereafter, the copolymer is separated and is washed and dried.

The dry, or substantially dry, copolymer containing phosphonic acid groups as substituents on aromatic nuclei thereof, is next reacted with a sulfonating agent such as chlorosulfonic acid, sulfuric acid, or sulfur trioxide, whereby sulfonic acid groups are substituted on aromatic nuclei in the same copolymer molecule.

The reaction of a sulfonating agent with the copolymer, containing substituent phosphonic acid groups on aromatic nuclei thereof, is usually carried out while the finely-divided copolymer is swollen by and dispersed in a liquid aliphatic polyhalohydrocarbon such as methylene chloride, carbon tetrachloride, chloroform, 1,1,1-trichloroethane, tetrachloroethane, or ethylene dichloride. The liquid medium is usually employed in amount sufficient to form a slurry or dispersion of the copolymer particles which can conveniently be stirred. The conditions under which the sulfonation may best be accomplished are dependent, in part, on the kind of sulfonating agent employed. In a preferred practice, the insoluble copolymer, containing phosphonic acid groups on the aromatic nuclei, is dispersed in a liquid aliphatic polyhalohydrocarbon, e. g. methylene chloride or carbon tetrachloride. The mixture is stirred and maintained at temperatures between —20 and 60° C. to swell the copolymer particles, after which chlorosulfonic acid is added as the sulfonating agent in the desired proportion and the reaction continued until complete.

The sulfonating agent reacts readily with the swollen copolymer particles. The reaction is substantially complete in a period of one hour or less, but a reaction time of from two to four hours is preferably employed.

The extent of the sulfonation is controlled, at least in part, by the proportion of the sulfonating agent employed in the reaction. The sulfonating agent, e. g. chlorosulfonic acid, is employed in amount corresponding to at least one, preferably from two to four, gram molecular proportions per gram molecular equivalent proportion of an aromatic nucleus in the copolymer. The copolymer containing phosphonic acid groups on its aromatic nuclei is reacted with the sulfonating agent in amount sufficient to produce a polymeric composition which contains at least 2, preferably from 2 to 12, sulfonic acid groups as substituents on aromatic nuclei thereof, for every 10 aromatic nuclei in the copolymer.

The sulfonation reaction employing sulfur trioxide as the sulfonating agent is carried out by suspending the finely-divided copolymer in a liquid aliphatic polychlorohydrocarbon such as methylene chloride, carbon tetrachloride, chloroform, 1,1,1-trichloroethane, tetrachloroethane, or ethylene dichloride, or a liquid mixture of from 20 to 80 per cent by weight of sulfur dioxide and from 80 to 20 per cent of one or more of said polychlorohydrocarbons, agitating and maintaining the mixture at temperatures between —20° and 60° C. and adding sulfur trioxide to the mixture in the desired proportion, e. g. in amount corresponding to from 2 to 4 gram molecular proportions of the sulfur trioxide per gram molecular equivalent proportion of an aromatic nucleus in the copolymer material to be sulfonated. The sulfonation reaction is carried out at atmospheric or superatmospheric pressures sufficient to maintain the reaction medium in liquid condition at the temperatures employed.

Sulfonation of the copolymer containing phosphonic acid groups on its aromatic nuclei employing sulfuric acid as the sulfonating agent is carried out in similar manner and at temperatures between 100° and 150° C., because the action of sulfuric acid to effect the substitution of a sulfonic acid group on an aromatic nucleus in the copolymer is weaker than that of strong sulfonating agents such as sulfur trioxide, or chlorosulfonic acid. The sulfonation reaction employing sulfuric acid should not be carried out for prolonged periods of time such as to result in deterioration of the copolymer, or destroying of the substituent phosphonic acid groups on aromatic nuclei of the copolymer.

After carrying out the sulfonation by any of the foregoing procedures, the copolymer is separated in usual ways, e. g. by filtering, and is washed with water, or is washed with an organic liquid, e. g. methyl alcohol, ethyl alcohol, acetone, and then with water. The product is obtained in the hydrogen form, i. e. as a resinous insoluble polymeric composition containing as substituents on aromatic nuclei of the copolymer molecule, both phosphonic acid groups and sulfonic acid groups directly attached to carbon atoms of aromatic nuclei in the same copolymer molecule. Materials prepared in accordance with the invention are capable of repeated use and regeneration in sorbing cations from fluids.

The preparation of cation exchange resins containing both phosphonate groups and sulfonate groups as substituents on aromatic nuclei of insoluble cross-linked vinyl aromatic copolymers as herein described permits the production of ion exchange resins having a greater total number of ion active groups or radicals, and correspondingly greater ion exchange capacity, than has heretofore been obtained by the introduction of phosphonate groups, or sulfonate groups, alone, onto aromatic nuclei of similar cross-linked insoluble vinyl aromatic copolymers.

The following examples illustrate ways in which the principle of the invention has been applied, but are not to be construed as limiting its scope.

*Example 1*

A charge of 10 grams (15 cc.) of a copolymer of 87.5 per cent by weight of styrene, 5 per cent of ethylvinylbenzene and 7.5 per cent of divinylbenzene, in the form of rounded particles of sizes between 20 and 50 mesh per inch, as determined by U. S. Standard screens, was placed in a glass reaction vessel equipped with a reflux condenser and stirrer. A charge of 53 grams (40 cc.) of phosphorus trichloride was added. The mixture was stirred for 30 minutes at room temperature. Thereafter, 6.2 grams of anhydrous aluminum chloride was added. The resulting mixture was stirred and heated at temperatures between 70° and 75° C. over a period of 4 hours. The mixture was cooled to a temperature of 20° C. and 100 cc. of carbon tetrachloride added. The mixture was then stirred and maintained at temperatures between 0° and 20° C. while slowly passing chlorine into the liquid. Feed of chlorine to the mixture was discontinued when the chlorine was no longer absorbed in the liquid. The copolymer was separated from the liquid by filtering and was washed with acetone and then with water. The wet copolymer product had a volume of 31 cc. and contained phosphonic acid groups directly attached to aromatic nuclei in the copolymer. It was tested to determine an ion exchange capacity for the resin. The product had a cation exchange capacity corresponding to 20,600 grains of calcium carbonate per cubic foot of a bed of the resin. The copolymer contained approximately 5 phosphonic acid groups for every 10 aromatic nuclei in the copolymer.

The above copolymer containing phosphonic acid groups were dried. A charge of 11 grams (15 cc.) of the dried copolymer, together with 60 cc. of methylene chloride was placed in a glass vessel equipped with a reflux condenser and stirrer. The mixture was stirred at room temperature for a period of 2 hours. Thereafter, 44,5 grams (25 cc.) of chlorosulfonic acid was added. The resulting mixture was stirred and maintained at a temperature of 40° C. for a period of 4 hours, then allowed to cool and was stirred for 16 hours at room temperature. The mixture was poured into about 1000 cc. of water, was stirred and the copolymer separated by filtering and washed with water. The wet copolymer product had a volume of 27.5 cc. The product had a cation exchange capacity corresponding to 40,500 grains of calcium carbonate per cubic foot of a bed of the resin. The copolymer contained approximately 9 sulfonic acid groups for every 10 aromatic nuclei in the copolymer.

Example 2

A phosphonic acid cation exchange resin was prepared by reacting phosphorus trichloride with copolymer of 87.5 per cent by weight of styrene, 5 per cent of ethylvinylbenzene and 7.5 per cent of divinylbenzene by suspending 100 parts by weight of the copolymer in the form of beads of sizes between 20 and 50 mesh per inch as determined by U. S. Standard screens in 350 cc. of phosphorus trichloride, adding 154 parts of anhydrous aluminum chloride in small portions and heating the resulting mixture at temperatures between 70° and 73° C. over a period of 24 hours. Thereafter, the phosphorated copolymer was separated from the liquid, was washed with water and the substituent phosphonus groups in the copolymer oxidized to the corresponding phosphonic acid groups. The product, i. e. the phosphonic acid cation exchange resin, had a capacity corresponding to 40,000 grains of calcium carbonate per cubic foot of a bed of the resin on a wet basis. The resin beads were washed with acetone and dried in air at room temperature. The dried resin had a cation exchange capacity corresponding to 6.4 milliequivalents of sodium hydroxide per gram of the resin. To a charge of 100 grams of the dried phosphonic acid cation exchange resin in a reaction vessel there was added 200 cc. of methylene chloride. The mixture was stirred at room temperature for a period of 30 minutes to swell the resin particles. Thereafter, 150 grams of chlorosulfonic acid was added. The resulting mixture was stirred and heated at temperatures between 35° and 40° C. for a period of 3 hours, then cooled. The beads were separated by filtering and were washed with water. A portion of the product was washed with acetone and dried in a vacuum oven at a temperature of 50° C. The dried copolymer beads had a cation exchange capacity of 8.4 milliequivalents of sodium hydroxide per gram of the resin. The final product contained approximately 6 phosphonic acid groups and about 10 sulfonic acid groups for every 10 aromatic nuclei in the copolymer.

We claim:

1. An insoluble resinous composition, suitable for use as a cation exchange agent, comprising an insoluble copolymer of from 80 to 99.5 weight per cent of at least one monovinyl aromatic hydrocarbon and from 20 to 0.5 per cent of at least one divinyl aromatic hydrocarbon, the said copolymer containing as substituents on aromatic nuclei thereof at least 0.5 phosphonate group and at least two sulfonate groups per ten aromatic nuclei.

2. An insoluble resinous composition suitable for the removal of cations from fluids, whcih comprises an insoluble cross-linked copolymer of a mixture of from 80 to 99.5 per cent by weight of at least one monovinyl aromatic hydrocarbon of the benzene series, and from 20 to 0.5 per cent of a divinyl aromatic hydrocarbon, the said copolymer containing as substituents on aromatic nuclei thereof at least two phosphonate groups and at least two sulfonate groups per ten aromatic nuclei.

3. An acidic form of an insoluble resinous composition as claimed in claim 2, wherein at least part of the phosphonate groups are phosphonic acid groups and at least part of the sulfonate groups are sulfonic acid groups.

4. An insoluble resinous composition suitable for the removal of cations from fluids, which comprises an insoluble cross-linked copolymer of a mixture of from 80 to 99.5 per cent by weight of at least one monovinyl aromatic hydrocarbon of the benzene series and from 20 to 0.5 per cent of a divinyl aromatic hydrocarbon, the said copolymer containing as substituents on aromatic nuclei thereof between two and ten phosphonate groups and between two and twelve sulfonate groups per ten aromatic nuclei.

5. An insoluble resinous composition as claimed in claim 4, which comprises an insoluble cross-linked copolymer of a mixture of at least 80 per cent by weight of styrene, a lesser amount of ethylvinylbenzene, and from 0.5 to 10 per cent of divinylbenzene, having both phosphonate groups and sulfonate groups as substituents on aromatic nuclei of the copolymer molecule.

6. An insoluble resinous composition as claimed in claim 4, which comprises an insoluble cross-linked copolymer of a mixture of from 80 to 99.5 per cent by weight of styrene and from 0.5 to 20 per cent of divinylbenzene, having both phosphonate groups and sulfonate groups as substituents on aromatic nuclei of the copolymer molecule.

7. A method of making an insoluble resinous composition suitable for the removal of cations from fluids, which method comprises reacting a phosphorated insoluble cross-linked copolymer of a mixture of from 80 to 99.5 per cent by weight of at least one monovinyl aromatic hydrocarbon of the benzene series, and from 20 to 0.5 per cent of a divinyl aromatic hydrocarbon, the said copolymer containing as substituents on aromatic nuclei thereof, at least 0.5 phosphonic acid group per ten aromatic nuclei, with a sulfonating agent selected from the group consisting of chlorosulfonic acid, sulfuric acid and sulfur trioxide, at reaction temperatures between —20° and 60° C. when the sulfonating agent is a member of the class consisting of chlorosulfonic acid and sulfur trioxide and at reaction temperatures between 100° and 150° C. when the sulfonating agent is sulfuric acid, and in amount corresponding to at least two gram molecular proportions of the sulfonating agent per ten gram molecular equivalent aromatic nuclei in the copolymer, whereby a polymeric composition containing as substituents on aromatic nuclei of the copolymer molecule at least 0.5 phosphonic acid group and at least two sulfonic acid groups per 10 aromatic nuclei is formed.

8. A method of making an insoluble resinous composition suitable for the removal of cations from fluids, which method comprises reacting a phosphorated insoluble cross-linked copolymer of a mixture of from 80 to 99.5 per cent by weight of at least one monovinyl aromatic hydrocarbon of the benzene series, and from 20 to 0.5 per cent of a divinyl aromatic hydrocarbon, the said copolymer containing as substituents on aromatic nuclei thereof, between two and ten phosphonic acid groups per ten aromatic nuclei, with a sulfonating agent selected from the group consisting of chlorosulfonic acid, sulfuric acid and sulfur trioxide, at reaction temperatures between —20° and 60° C. when the sulfonating agent is a member of the class consisting of chlorosulfonic acid and sulfur trioxide and at reaction temperatures between 100° and 150° C. when the sulfonating agent is sulfuric acid, and in amount corresponding to at least two gram molecular proportions of the sulfonating agent per ten gram molecular equivalent aromatic nuclei in the copolymer, whereby a polymeric composition containing as substituents on aromatic nuclei of the copolymer molecule between two and ten phosphonic acid groups and from two to twelve sulfonic acid groups per ten aromatic nuclei is formed.

9. A method of making an insoluble resinous composition as claimed in claim 8, wherein the phosphorated insoluble cross-linked copolymer is a copolymer of a mixture of at least 80 per cent by weight of styrene, a lesser amount of ethylvinylbenzene, and from 0.5 to 10 per cent of divinylbenzene.

10. A method of making an insoluble resinous composition as claimed in claim 8, wherein the phosphorated insoluble cross-linked copolymer in the form of small particles is suspended in a liquid aliphatic polychlorohydrocarbon selected from the group consisting of methylene chloride, carbon tetrachloride, choloroform, 1,1,1-trichloroethane, tetrachloroethane and ethylene dichloride, which is capable of swelling the particles of the phosphorated copolymer, and the particles are then reacted with a sulfonating agent selected from the group consisting of chlorosulfonic acid, sulfuric acid and sulfur trioxide, at reaction temperatures between −20° and 60° C. when the sulfonating agent is a member of the class consisting of chlorosulfonic acid and sulfur trioxide, and at reaction temperatures between 100° and 150° C. when the sulfonating agent is sulfuric acid, and in amount corresponding to at least two gram molecular proportions of the sulfonating agent per ten gram molecular equivalent aromatic nuclei in the copolymer, whereby a polymeric composition containing as substituents on aromatic nuclei of the copolymer molecule between two and ten phosphonic acid groups and between two and twelve sulfonic acid groups per ten aromatic nuclei is formed.

11. A method of making an insoluble resinous composition suitable for the removal of cations from fluids, which method comprises suspending particles of a phosphorated insoluble cross-linked copolymer of a mixture of at least 80 per cent by weight of styrene, a lesser amount of ethylvinylbenzene and from 0.5 to 10 per cent of divinylbenzene, the said copolymer containing as substituents on aromatic nuclei thereof, between two and ten phosphonic acid groups per ten aromatic nuclei, in a liquid aliphatic polychlorohydrocarbon selected from the group consisting of methylene chloride, carbon tetrachloride, chloroform, 1,1,1-trichloroethane, tetrachloroethane and ethylene dichloride, which is capable of swelling the particles of the phosphorated copolymer, and then reacting the phosphorated copolymer particles with chlorosulfonic acid, at reaction temperatures between −20° and 60° C. and in amount corresponding to at least two gram molecular proportions of the chlorosulfonic acid per ten gram molecular equivalent aromatic nuclei in the copolymer, whereby a polymeric composition containing as substituents on aromatic nuclei of the copolymer molecule from two to ten phosphonic acid groups and from two to twelve sulfonic acid groups per ten aromatic nuclei is formed.

No references cited.